US012666042B2

(12) United States Patent
Wang et al.

(10) Patent No.: US 12,666,042 B2
(45) Date of Patent: Jun. 23, 2026

(54) DECODING METHOD, ENCODING METHOD, AND RELATED DEVICE

(71) Applicant: HUAWEI TECHNOLOGIES CO., LTD., Shenzhen (CN)

(72) Inventors: Danni Wang, Xi'an (CN); Haitao Yang, Shenzhen (CN); Yi Luo, Shenzhen (CN); Junkai Feng, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 19/074,009

(22) Filed: Mar. 7, 2025

(65) Prior Publication Data

US 2025/0211759 A1 Jun. 26, 2025

Related U.S. Application Data

(63) Continuation of application No. PCT/CN2023/116724, filed on Sep. 4, 2023.

(30) Foreign Application Priority Data

Sep. 8, 2022 (CN) .......................... 202211099536.4
Mar. 6, 2023 (CN) .......................... 202310258261.2

(51) Int. Cl.
*H04N 19/152* (2014.01)
*H04N 19/14* (2014.01)
(52) U.S. Cl.
CPC ........... *H04N 19/152* (2014.11); *H04N 19/14* (2014.11)
(58) Field of Classification Search
CPC .. H04N 19/152; H04N 19/176; H04N 19/426; H04N 19/124; H04N 19/42;

(Continued)

(56) References Cited

U.S. PATENT DOCUMENTS 5,491,480 A 2/1996 Jan et al.
2005/0015259 A1 1/2005 Thumpudi et al.
(Continued)

FOREIGN PATENT DOCUMENTS

CN 102724510 A 10/2012
WO 2021244341 A1 12/2021

OTHER PUBLICATIONS

International Search Report and Written Opinion in International Appln. No. PCT/CN2023/116724, mailed on Dec. 1, 2023, 14 pages (with English translation).

(Continued)

*Primary Examiner* — Fabio S Lima
(74) *Attorney, Agent, or Firm* — Fish & Richardson P.C.

(57) ABSTRACT

Embodiments of this application provide a decoding method. The method includes: obtaining a bitstream of a first coding unit, where the first coding unit is at least one coding unit in a plurality of coding units; determining an end decrease step, wherein the end decrease step is used to update a virtual padding amount of the plurality of coding units; determining the virtual padding amount of the plurality of coding units based on the end decrease step, where the virtual padding amount is used to reduce storage space of a buffer in a decoding device; determining that an encoding mode of the first coding unit in the plurality of coding units is a fallback mode; and decoding the bitstream of the first coding unit based on the virtual padding amount and the fallback mode, to obtain first data. In an encoding/decoding process, the virtual padding amount is considered in the fallback mode, in other words, encoding/decoding is performed based on the virtual padding amount and the fallback mode, and the virtual padding amount may be used to reduce the storage space of the buffer. This reduces buffer overflow in the encoding/decoding process in the fallback mode.

16 Claims, 8 Drawing Sheets

101

Bitstream of data

102

First device

Second device

(58) Field of Classification Search
CPC .... H04N 19/146; H04N 19/184; H04N 19/44;
H04N 19/70; H04N 19/91
See application file for complete search history.

(56) References Cited

U.S. PATENT DOCUMENTS

| | | |
|---|---|---|
| 2007/0189380 A1 | 8/2007 | Goh et al. |
| 2020/0202574 A1 | 6/2020 | Thirumalai |

OTHER PUBLICATIONS

Haskell, B. G. et al., "Section 8.3.3. Video Buffer Verifier," Jan. 1, 1997, 27 pages.
Video Electronics Standards Association (VESA), "VESA Display Compression-M (VDC-M) Standard," Version 1.1, May 11, 2018, 173 pages.
Extended European Search Report in European Appln. No. 23862339. 1, mailed on Nov. 27, 2025, 9 pages.

First device

Bitstream of data

Second device

DECODING METHOD, ENCODING METHOD, AND RELATED DEVICE

CROSS-REFERENCE TO RELATED APPLICATIONS

This application is a continuation of International Application No. PCT/CN2023/116724, filed on Sep. 4, 2023, which claims priority to Chinese Patent Application No. 202211099536.4, filed on Sep. 8, 2022 and Chinese Patent Application No. 202310258261.2, filed on Mar. 6, 2023. All of the aforementioned patent applications are hereby incorporated by reference in their entireties.

TECHNICAL FIELD

This application relates to the field of encoding and decoding technologies, and in particular, to a decoding method, an encoding method, and a related device.

BACKGROUND

In recent years, as performance of a media collection device is improved and people have an increasing requirement for video quality, a specification of video data is also rapidly improved, to be specific, a resolution and a frame rate of a video are higher. A video with a higher specification has a larger data amount per unit time. This poses new challenges to throughputs of a display interface and a display link. A typical procedure of compression on the display interface is as follows: On an input side interface, an encoder performs encoding operations such as prediction, quantization, and entropy encoding on an input single-frame image, and compresses the input single-frame image into a bitstream. The bitstream is transmitted to an output side interface through the display link. At the output side interface, a decoder decompresses the bitstream, performs decoding operations such as entropy decoding, dequantization, and reconstruction, and finally outputs a reconstructed image.

Currently, in an interface compression scenario, to stabilize subsequent operations such as display, a bitstream buffer is introduced at an encoder side, to reduce buffer overflow in cooperation with a fallback mode. Specifically, when a sum of an encoded bit quantity of an image block of a single frame of image input to the buffer and a data amount of the current buffer exceeds a specified threshold (overflow threshold), special encoding in the fallback mode is performed on the image block, so that the encoded bit quantity of the image block is a specified value. In this way, it is ensured that the sum of the encoded bit quantity of the image block input to the buffer and the data amount of the current buffer does not overflow.

However, in a virtual padding scenario, a manner of determining, during encoding/decoding, whether the buffer overflows is determining whether a sum of a virtual padding data amount and a data amount of the current buffer is greater than the overflow threshold. In the fallback mode, the foregoing method for determining overflow may cause the sum of the data amount of the current buffer and the virtual padding data amount to exceed the overflow threshold. This affects encoding/decoding.

SUMMARY

This application provides a decoding method, an encoding method, and a related device, to reduce buffer overflow in an encoding/decoding process in a fallback mode.

A first aspect of embodiments of this application provides a decoding method. The decoding method may be performed by a decoding device, or may be performed by a component (for example, a processor, a chip, or a chip system) of the decoding device. The method includes: obtaining a bitstream of a first coding unit, where the first coding unit is at least one coding unit in a plurality of coding units; determining an end decrease step, where the end decrease step is used to update a virtual padding amount of the plurality of coding units; determining the virtual padding amount of the plurality of coding units based on the end decrease step, where the virtual padding amount is used to reduce storage space of a buffer in the decoding device; determining that an encoding mode of the first coding unit in the plurality of coding units is a fallback mode; and decoding the bitstream of the first coding unit based on the virtual padding amount and the fallback mode, to obtain first data.

In this embodiment of this application, in an encoding/decoding process, the virtual padding amount is considered in the fallback mode, that is, encoding/decoding is performed based on the virtual padding amount and the fallback mode, and the virtual padding amount may be used to reduce the storage space of the buffer. This reduces buffer overflow in the encoding/decoding process in the fallback mode.

Optionally, in a possible implementation of the first aspect, before the step of determining the end decrease step, the method further includes: obtaining an original bit quantity of the first coding unit, a preset compression rate, and a minimum encoded bit quantity of the plurality of coding units; and the determining an end decrease step includes: determining an end decrease step logarithm value based on the original bit quantity, the preset compression rate, and the minimum encoded bit quantity; and determining the end decrease step based on the end decrease step logarithm value.

In this possible implementation, the end decrease step logarithm value is determined based on the minimum encoded bit quantity, and the end decrease step is determined based on the end decrease step logarithm value. In other words, the minimum encoded bit quantity is considered in a process of setting the end decrease step. This ensures that a data amount of the buffer does not overflow after decoding of a current coding unit is completed.

Optionally, in a possible implementation of the first aspect, an upper limit of the end decrease step logarithm value is a logarithm value of a first difference to base 2, and the first difference is a difference obtained by subtracting the minimum encoded bit quantity from a product of the original bit quantity and the preset compression rate.

In this possible implementation, during encoding/decoding, when the coding unit is in a virtual padding state, the minimum encoded bit quantity in the fallback mode is affected by the end decrease step. In addition, a maximum range of the end decrease step is determined by the minimum encoded bit quantity in the fallback mode. This ensures that rate control can use virtual padding to gradually decrease a data amount of a physical buffer to an expected data amount of the buffer, and the buffer does not overflow in the fallback mode in the virtual padding state.

Optionally, in a possible implementation of the first aspect, the foregoing step of determining the virtual padding amount of the plurality of coding units based on the end decrease step includes: if a ranking of the first coding unit in the plurality of coding units is greater than or equal to a preset threshold, determining the virtual padding amount based on a base data amount and the end decrease step logarithm value, where the preset threshold is used to determine a quantity of coding units on which virtual padding is performed in the plurality of coding units, and the base data amount is a data amount on which virtual padding has been performed in the plurality of coding units before the first coding unit.

In this possible implementation, a coding unit threshold for performing virtual padding in the plurality of coding units may be set based on an actual requirement, and then an overall virtual padding amount of the plurality of coding units is determined based on the threshold.

Optionally, in a possible implementation of the first aspect, the virtual padding amount is equal to a sum of the base data amount and the end decrease step.

In this possible implementation, simple calculation of the virtual padding amount is provided. Calculation is performed by accumulating the coding units step by step, so that the overall virtual padding amount of the plurality of coding units can be obtained.

Optionally, in a possible implementation of the first aspect, the decoding the bitstream of the first coding unit based on the virtual padding amount and the fallback mode includes: determining an encoding length of the fallback mode based on the virtual padding amount; and decoding the bitstream of the first coding unit based on the encoding length.

In this possible implementation, the end decrease step is determined based on the minimum encoded bit quantity, and the encoding length of the fallback mode is set based on the end decrease step, to reduce buffer overflow. It may also be understood that, during virtual padding, the end decrease step is considered for the encoding length in the fallback mode, to ensure that the data amount of the buffer does not overflow after decoding of the current coding unit ends.

Optionally, in a possible implementation of the first aspect, if the virtual padding amount is greater than 0, the encoding length is a difference between a first value and a header information overhead bit of the fallback mode, the first value is a quotient of a second difference and a quantity of pixels in the first coding unit, and the second difference is a difference obtained by subtracting the end decrease step from the product of the original bit quantity of the first coding unit and the preset compression rate; or if the virtual padding amount is equal to 0, the encoding length is a difference between the product of the original bit quantity and the preset compression rate and the header information overhead bit of the fallback mode.

In this possible implementation, different encoding lengths are determined based on different cases of the virtual padding amount, to consider both a decoding process of a coding unit on which virtual padding is performed and a decoding process of a coding unit on which no virtual padding is performed.

A second aspect of embodiments of this application provides an encoding method. The encoding method may be performed by an encoding device, or may be performed by a component (for example, a processor, a chip, or a chip system) of the encoding device. The method includes: obtaining a first coding unit, where the first coding unit is at least one coding unit in a plurality of coding units; determining an end decrease step, where the end decrease step is used to update a virtual padding amount of the plurality of coding units; determining the virtual padding amount of the plurality of coding units based on the end decrease step, where the virtual padding amount is used to reduce storage space of a buffer in the encoding device; determining that an encoding mode of the first coding unit in the plurality of coding units is a fallback mode; and encoding the first coding unit based on the virtual padding amount and the fallback mode to obtain a bitstream.

In this embodiment of this application, in an encoding process, the virtual padding amount is considered in the fallback mode, that is, encoding is performed based on the virtual padding amount and the fallback mode, and the virtual padding amount may be used to reduce storage space of the buffer. This reduces buffer overflow in the encoding process in the fallback mode.

Optionally, in a possible implementation of the second aspect, the foregoing step of determining that an encoding mode of the first coding unit in the plurality of coding units is a fallback mode includes: if encoding lengths of the first coding unit corresponding to a plurality of encoding modes are greater than a preset code length, determining that the encoding mode of the first coding unit is the fallback mode, where the preset code length is a quotient of a second difference and a quantity of pixels in the first coding unit, and the second difference is a difference obtained by subtracting the end decrease step from a product of an original bit quantity of the first coding unit and a preset compression rate.

In this possible implementation, in the encoding process, a specific encoding mode may be first determined from the plurality of encoding modes by using an evaluation indicator, to improve encoding performance of the coding unit.

Optionally, in a possible implementation of the second aspect, before the step of determining the end decrease step, the method further includes: obtaining an original bit quantity of the first coding unit, a preset compression rate, and a minimum encoded bit quantity of the plurality of coding units; and the determining an end decrease step includes: determining an end decrease step logarithm value based on the original bit quantity, the preset compression rate, and the minimum encoded bit quantity; and determining the end decrease step based on the end decrease step logarithm value.

In this possible implementation, the end decrease step logarithm value is determined based on the minimum encoded bit quantity, and the end decrease step is determined based on the end decrease step logarithm value. In other words, the minimum encoded bit quantity is considered in a process of setting the end decrease step. This ensures that a data amount of the buffer does not overflow after decoding of a current coding unit is completed.

Optionally, in a possible implementation of the second aspect, an upper limit of the end decrease step logarithm value is a logarithm value of a first difference to base 2, and the first difference is a difference obtained by subtracting the minimum encoded bit quantity from a product of the original bit quantity and the preset compression rate.

In this possible implementation, during encoding/decoding, when the coding unit is in a virtual padding state, the minimum encoded bit quantity in the fallback mode is affected by the end decrease step. In addition, a maximum range of the end decrease step is determined by the minimum encoded bit quantity in the fallback mode. This ensures that rate control can use virtual padding to gradually decrease a data amount of a physical buffer to an expected data amount of the buffer, and the buffer does not overflow in the fallback mode in the virtual padding state.

Optionally, in a possible implementation of the second aspect, the foregoing step of determining the virtual padding amount of the plurality of coding units based on the end decrease step includes: if a ranking of the first coding unit in the plurality of coding units is greater than or equal to a preset threshold, determining the virtual padding amount based on a base data amount and the end decrease step logarithm value, where the preset threshold is used to determine a quantity of coding units on which virtual padding is performed in the plurality of coding units, and the base data amount is a data amount on which virtual padding has been performed in the plurality of coding units before the first coding unit.

In this possible implementation, a coding unit threshold for performing virtual padding in the plurality of coding units may be set based on an actual requirement, and then an overall virtual padding amount of the plurality of coding units is determined based on the threshold.

Optionally, in a possible implementation of the second aspect, the virtual padding amount is equal to a sum of the base data amount and the end decrease step.

In this possible implementation, simple calculation of the virtual padding amount is provided. Calculation is performed by accumulating the coding units step by step, so that the overall virtual padding amount of the plurality of coding units can be obtained.

Optionally, in a possible implementation of the second aspect, the step of encoding the first coding unit based on the virtual padding amount and the fallback mode to obtain the bitstream includes: determining an encoding length of the fallback mode based on the virtual padding amount; and decoding the first coding unit based on the encoding length to obtain the bitstream.

In this possible implementation, the end decrease step is determined based on the minimum encoded bit quantity, and the encoding length of the fallback mode is set based on the end decrease step, to reduce buffer overflow. It may also be understood that, during virtual padding, the end decrease step is considered for a code length in the fallback mode, to ensure that the data amount of the buffer does not overflow after encoding of the current coding unit ends.

Optionally, in a possible implementation of the second aspect, if the virtual padding amount is greater than 0, the encoding length is a difference between a first value and a header information overhead bit of the fallback mode, the first value is a quotient of a second difference and a quantity of pixels in the first coding unit, and the second difference is a difference obtained by subtracting the end decrease step from the product of the original bit quantity of the first coding unit and the preset compression rate; or if the virtual padding amount is equal to 0, the encoding length is a difference between the product of the original bit quantity and the preset compression rate and the header information overhead bit of the fallback mode.

In this possible implementation, different encoding lengths are determined based on different cases of the virtual padding amount, to consider both an encoding process of a coding unit on which virtual padding is performed and an encoding process of a coding unit on which no virtual padding is performed.

A third aspect of embodiments of this application provides a decoding device. The decoding device includes: an obtaining unit, configured to obtain a bitstream of a first coding unit, where the first coding unit is at least one coding unit in a plurality of coding units; a determining unit, configured to determine an end decrease step, where the end decrease step is used to update a virtual padding amount of the plurality of coding units; the determining unit is further configured to determine the virtual padding amount of the plurality of coding units based on the end decrease step, where the virtual padding amount is used to reduce storage space of a buffer in the decoding device; the determining unit is further configured to determine that an encoding mode of the first coding unit in the plurality of coding units is a fallback mode; and a decoding unit, configured to decode the bitstream of the first coding unit based on the virtual padding amount and the fallback mode, to obtain first data.

Optionally, in a possible implementation of the third aspect, the obtaining unit is further configured to obtain an original bit quantity of the first coding unit, a preset compression rate, and a minimum encoded bit quantity of the plurality of coding units; the determining unit is specifically configured to determine an end decrease step logarithm value based on the original bit quantity, the preset compression rate, and the minimum encoded bit quantity; and the determining unit is specifically configured to determine the end decrease step based on the end decrease step logarithm value.

Optionally, in a possible implementation of the third aspect, an upper limit of the end decrease step logarithm value is a logarithm value of a first difference to base 2, and the first difference is a difference obtained by subtracting the minimum encoded bit quantity from a product of the original bit quantity and the preset compression rate.

Optionally, in a possible implementation of the third aspect, the determining unit is specifically configured to: if a ranking of the first coding unit in the plurality of coding units is greater than or equal to a preset threshold, determine the virtual padding amount based on a base data amount and the end decrease step logarithm value, where the preset threshold is used to determine a quantity of coding units on which virtual padding is performed in the plurality of coding units, and the base data amount is a data amount on which virtual padding has been performed in the plurality of coding units before the first coding unit.

Optionally, in a possible implementation of the third aspect, the virtual padding amount is equal to a sum of the base data amount and the end decrease step.

Optionally, in a possible implementation of the third aspect, the decoding unit is specifically configured to determine an encoding length of the fallback mode based on the virtual padding amount; and the decoding unit is specifically configured to decode the bitstream of the first coding unit based on the encoding length.

Optionally, in a possible implementation of the third aspect, if the virtual padding amount is greater than 0, the encoding length is a difference between a first value and a header information overhead bit of the fallback mode, the first value is a quotient of a second difference and a quantity of pixels in the first coding unit, and the second difference is a difference obtained by subtracting the end decrease step from the product of the original bit quantity of the first coding unit and the preset compression rate; or if the virtual padding amount is equal to 0, the encoding length is a difference between the product of the original bit quantity and the preset compression rate and the header information overhead bit of the fallback mode.

A fourth aspect of embodiments of this application provides an encoding device. The encoding device includes: an obtaining unit, configured to obtain a first coding unit, where the first coding unit is at least one coding unit in a plurality of coding units; a determining unit, configured to determine an end decrease step, where the end decrease step is used to update a virtual padding amount of the plurality of coding units; the determining unit is further configured to determine the virtual padding amount of the plurality of coding units based on the end decrease step, where the virtual padding amount is used to reduce storage space of a buffer in the encoding device; the determining unit is further configured to determine that an encoding mode of the first coding unit in the plurality of coding units is a fallback mode; and an encoding unit, configured to encode the first coding unit based on the virtual padding amount and the fallback mode to obtain a bitstream.

Optionally, in a possible implementation of the fourth aspect, the determining unit is specifically configured to: if encoding lengths of the first coding unit corresponding to a plurality of encoding modes are greater than a preset code length, determine that the encoding mode of the first coding unit is the fallback mode, where the preset code length is a quotient of a second difference and a quantity of pixels in the first coding unit, and the second difference is a difference obtained by subtracting the end decrease step from a product of an original bit quantity of the first coding unit and a preset compression rate.

Optionally, in a possible implementation of the fourth aspect, the obtaining unit is further configured to obtain an original bit quantity of the first coding unit, a preset compression rate, and a minimum encoded bit quantity of the plurality of coding units; the determining unit is specifically configured to determine an end decrease step logarithm value based on the original bit quantity, the preset compression rate, and the minimum encoded bit quantity; and the determining unit is specifically configured to determine the end decrease step based on the end decrease step logarithm value.

Optionally, in a possible implementation of the fourth aspect, an upper limit of the end decrease step logarithm value is a logarithm value of a first difference to base 2, and the first difference is a difference obtained by subtracting the minimum encoded bit quantity from a product of the original bit quantity and the preset compression rate.

Optionally, in a possible implementation of the fourth aspect, the determining unit is specifically configured to: if a ranking of the first coding unit in the plurality of coding units is greater than or equal to a preset threshold, determine the virtual padding amount based on a base data amount and the end decrease step logarithm value, where the preset threshold is used to determine a quantity of coding units on which virtual padding is performed in the plurality of coding units, and the base data amount is a data amount on which virtual padding has been performed in the plurality of coding units before the first coding unit.

Optionally, in a possible implementation of the fourth aspect, the virtual padding amount is equal to a sum of the base data amount and the end decrease step.

Optionally, in a possible implementation of the fourth aspect, the encoding unit is specifically configured to determine an encoding length of the fallback mode based on the virtual padding amount; and the encoding unit is specifically configured to encode the first coding unit based on the encoding length to obtain the bitstream.

Optionally, in a possible implementation of the fourth aspect, if the virtual padding amount is greater than 0, the encoding length is a difference between a first value and a header information overhead bit of the fallback mode, the first value is a quotient of a second difference and a quantity of pixels in the first coding unit, and the second difference is a difference obtained by subtracting the end decrease step from the product of the original bit quantity of the first coding unit and the preset compression rate; or if the virtual padding amount is equal to 0, the encoding length is a difference between the product of the original bit quantity and the preset compression rate and the header information overhead bit of the fallback mode.

A fifth aspect of embodiments of this application provides a decoding device, including a processor. The processor is coupled to a memory, and the memory is configured to store a program or instructions. When the program or the instructions are executed by the processor, the decoding device is enabled to implement the method according to any one of the first aspect or the possible implementations of the first aspect.

A sixth aspect of embodiments of this application provides an encoding device, including a processor. The processor is coupled to a memory, and the memory is configured to store a program or instructions. When the program or the instructions are executed by the processor, the encoding device is enabled to implement the method according to any one of the second aspect or the possible implementations of the second aspect.

A seventh aspect of embodiments of this application provides a communication system, including the decoding device according to any one of the fifth aspect or the possible designs of the fifth aspect and the encoding device according to any one of the sixth aspect or the possible designs of the sixth aspect.

An eighth aspect of embodiments of this application provides a computer-readable medium. The computer-readable medium stores a computer program or instructions. When the computer program or the instructions runs/run on a computer, the computer is enabled to perform the method according to any one of the first aspect or the possible implementations of the first aspect, or the computer is enabled to perform the method according to any one of the second aspect or the possible implementations of the second aspect.

A ninth aspect of embodiments of this application provides a computer program product. When the computer program product is executed on a computer, the computer is enabled to perform the method according to any one of the first aspect or the possible implementations of the first aspect, or the computer is enabled to perform the method according to any one of the second aspect or the possible implementations of the second aspect.

It can be learned from the foregoing technical solutions that this application has the following advantages: In an encoding/decoding process, the virtual padding amount is considered in the fallback mode, that is, encoding/decoding is performed based on the virtual padding amount and the fallback mode, and the virtual padding amount may be used to reduce the storage space of the buffer. This reduces buffer overflow in the encoding/decoding process in the fallback mode.

DESCRIPTION OF EMBODIMENTS

Figure 1:
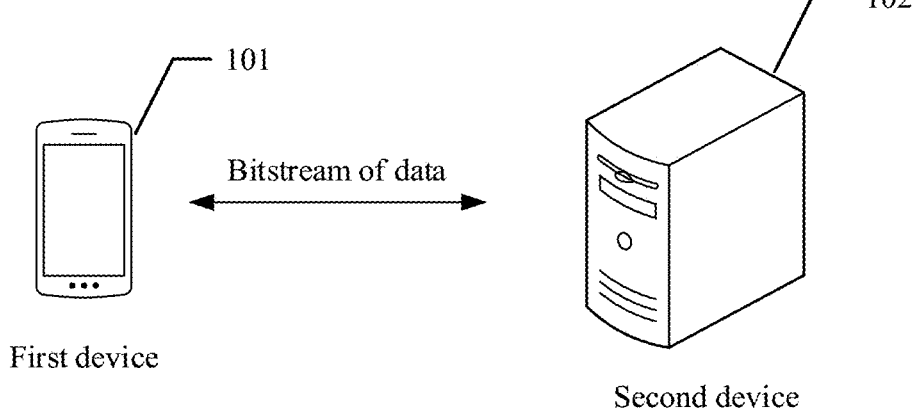
FIG. 1 is a diagram of a structure of a communication system according to an embodiment of this application.

This application provides a decoding method, an encoding method, and a related device, to reduce buffer overflow in an encoding/decoding process in a fallback mode.

For ease of understanding, mainly related terms and concepts in embodiments of this application are first described below.

1. Interface Compression

When transmitting an image and a video, a media device uses a display interface to compress (encode) and decompress (decode) image and video data transmitted through the display interface. This is abbreviated as interface compression.

2. Coding Unit

The coding unit may be an object to be processed in an encoding process or a decoding process. For example, the coding unit is obtained by dividing an image. For another example, the coding unit is a unit corresponding to a syntax element or a bitstream obtained after decoding.

3. Rate Control

Rate control may also be referred to as rate control. In a process of adjusting an output bit rate in an encoding process, the output bit rate is adjusted by analyzing information such as current image content and a bitstream buffer margin and by changing a quantization parameter and an encoding mode for encoding.

4. Constant Bit Rate (Constant Bit Rate, CBR) Policy

The CBR is a rate control policy, and a feature of the CBR is that lengths of bitstreams output by an encoder are the same in a unit time.

5. Quantization Parameter (Quantization Parameter, QP)

In an encoding process, a residual value generated through a prediction operation or a coefficient generated through a transform operation is quantized and then written into a bitstream. In a decoding process, a syntax element is dequantized to obtain the residual value or the coefficient. The QP is a parameter used in a quantization process. Generally, a larger QP value indicates a more obvious quantization degree. Adjusting the QP value directly affects a length of an encoded bitstream and quality of a decoded image.

6. Fallback Mode

The fallback mode is a prediction mode. In encoding in another prediction mode, when a sum of an encoded bit quantity input to a buffer and a data amount of a current buffer exceeds a specified threshold (overflow threshold), in other words, when overflow occurs, special encoding is performed on an image block, so that an encoded bit quantity of the image block is a specified value. In this way, it is ensured that the sum of the encoded bit quantity of the image block input to the buffer and the data amount of the current buffer does not overflow. The encoded bit quantity input to the buffer is a current encoded bit quantity of the image block minus a channel transmission bit quantity.

7. Virtual Padding

Virtual padding is used to adjust available space of the buffer by setting a virtual padding data amount (not really padding the current buffer with so much data, but only a data amount number). Specifically, a sum of the virtual padding data amount and the data amount of the current buffer may be used for overflow determining. When the sum of the virtual padding data amount and the data amount of the current buffer is greater than the overflow threshold, overflow occurs. When the sum of the virtual padding data amount and the data amount of the current buffer is not greater than the overflow threshold, no overflow occurs. That is, in a case of virtual padding, overflow is implemented by comparing the overflow threshold with the sum of the virtual padding data amount and the data amount of the current buffer. In a case of no virtual padding, overflow is implemented by comparing the overflow threshold with the data amount of the current buffer. The overflow threshold is generally a fixed value, is agreed in advance, and does not change due to whether there is a virtual padding operation.

Currently, in an interface compression scenario, to stabilize subsequent operations such as display, a bitstream buffer is introduced at an encoder side, to reduce buffer overflow in cooperation with a fallback mode. Specifically, when a sum of an encoded bit quantity of an image block of a single frame of image input to the buffer and the data amount of the current buffer exceeds a specified threshold (overflow threshold), special encoding in the fallback mode is performed on the image block, so that the encoded bit quantity of the image block is a specified value. In this way, it is ensured that the sum of the encoded bit quantity of the image block input to the buffer and the data amount of the current buffer does not overflow.

However, in a virtual padding scenario, a manner of determining, during encoding/decoding, whether the buffer overflows is determining whether a sum of a virtual padding data amount and a data amount of the current buffer is greater than an overflow threshold. In the fallback mode, the foregoing method for determining overflow may cause a sum of the data amount of the current buffer and the virtual padding data amount to exceed the overflow threshold. This affects encoding/decoding.

To resolve the foregoing technical problem, embodiments of this application provide a decoding method, an encoding method, and a related device. In an encoding/decoding process, the virtual padding amount is considered in the fallback mode, in other words, encoding/decoding is performed based on the virtual padding amount and the fallback mode, and the virtual padding amount may be used to reduce the storage space of the buffer. This reduces buffer overflow in the encoding/decoding process in the fallback mode.

Before the method provided in embodiments of this application is described, a communication system to which the method provided in embodiments of this application is applicable is first described. The communication system includes a first device 101 and a second device 102. The first device 101 performs data communication with the second device 102. The first device 101 and the second device 102 are devices with an encoding and/or decoding function.

In a possible implementation, the first device 101 serves as a transmit end, and the second device 102 serves as a receive end. To reduce transmission of a data amount, the first device 101 encodes data to obtain a bitstream of the data, and sends the bitstream of the data to the second device 102. After receiving the bitstream, the second device 102 decodes the bitstream to obtain the data. In this way, data transmission between the first device 101 and the second device 102 is implemented.

In another possible implementation, the second device 102 serves as a transmit end, and the first device 101 serves as a receive end. To reduce transmission of a data amount, the second device 102 encodes data to obtain a bitstream of the data, and sends the bitstream of the data to the first device 101. After receiving the bitstream, the first device 101 decodes the bitstream to obtain the data. In this way, data transmission between the first device 101 and the second device 102 is implemented.

In this embodiment of this application, only one first device 101 and one second device 102 are used as an example for description. In actual application, the communication system in this embodiment of this application may have another forwarding device and the like, to implement bitstream forwarding between the first device 101 and the second device 102. In addition, there may be a plurality of first devices 101 and a plurality of second devices 102. This is not specifically limited herein.

In this embodiment of this application, in FIG. 1, only transmission between a terminal and a network end is used as an example for description. In actual application, the first device 101 and the second device 102 may be terminal devices. Alternatively, the first device 101 and the second device 102 are network devices. Alternatively, the first device 101 is a terminal device, and the second device 102 is a network device. Alternatively, the second device 102 is a terminal device, and the first device 101 is a network device. That is, transmission between the first device 101 and the second device 102 may be transmission between a terminal and a terminal, transmission between a network end and a network end, transmission between a terminal and a network end, or the like. This is not specifically limited herein.

Transmission between the terminal and the network end is used as an example. The terminal device may be a device with an encoding and/or decoding function, and may be deployed on land, including an indoor or outdoor device, a handheld device, a wearable device, or a vehicle-mounted device, or may be deployed on water (for example, on a ship), or may be deployed in the air (for example, on an airplane, on a balloon, or on a satellite). The terminal device may be a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. An application scenario is not limited in embodiments of this application. The terminal device sometimes may also be referred to as a terminal, user equipment (user equipment, UE), an access terminal device, a vehicle-mounted terminal, an industrial control terminal, a UE unit, a UE station, a mobile station, a mobile console, a remote station, a remote terminal device, a mobile device, a UE agent, a UE apparatus, or the like. The terminal device may be fixed or mobile.

The network device is a device with an encoding and/or decoding function. The network device may include various forms of base stations, macro base stations, micro base stations (also referred to as small cells), relay stations, access points, or the like. In systems using different radio access technologies, names of the network device may be different, for example, an eNB or an eNodeB (evolutional NodeB) in LTE (long term evolution, long term evolution).

Alternatively, the network device may be a radio controller in a CRAN (Cloud Radio Access Network, cloud radio access network) scenario. Alternatively, the network device may be a base station device in a 5G network or a network device in a future evolved network. Alternatively, the network device may be a wearable device or a vehicle-mounted device. The network device may alternatively be a transmission and reception point (transmission and reception point, TRP).

The following describes an overall encoding procedure and an overall decoding procedure to which the method provided in embodiments of this application is applied.

Figure 2:
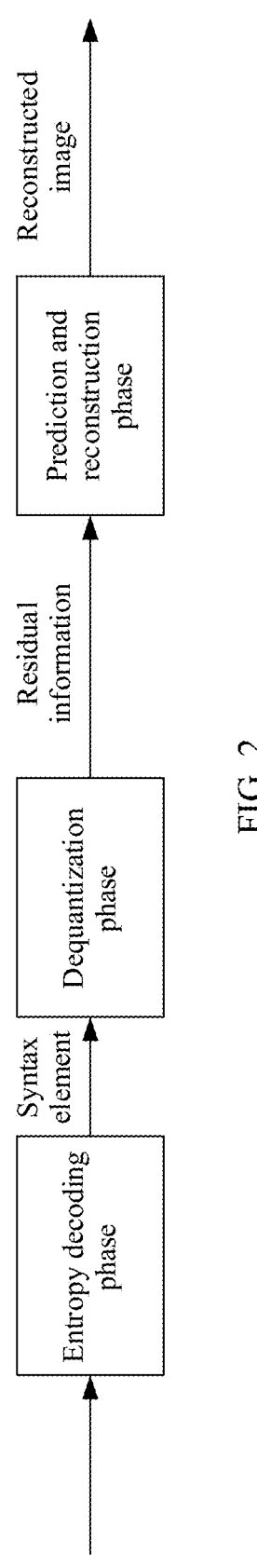
FIG. 2 is a diagram of an overall decoding procedure according to an embodiment of this application.

FIG. 2 shows an overall decoding procedure according to an embodiment of this application. The overall decoding procedure includes an entropy decoding phase, a dequantization phase, a prediction and reconstruction phase, and the like. It may be understood that, in actual application, there may be another case in the decoding procedure. For example, the decoding procedure includes the entropy decoding phase. For another example, the decoding procedure includes the entropy decoding phase, the dequantization phase, and the like. This is not specifically limited herein.

For example, a decoder side decodes an image. The decoder side performs entropy decoding on a bitstream of the image to obtain a syntax element, performs dequantization on the syntax element to obtain residual information, and performs processing such as prediction and reconstruction on the residual information to output a reconstructed image (that is, an image obtained after bitstream restoration).

The decoding method provided in this embodiment of this application may be applied to the entropy decoding phase, or may be applied to the overall decoding procedure. This is not specifically limited herein.

Figure 3:
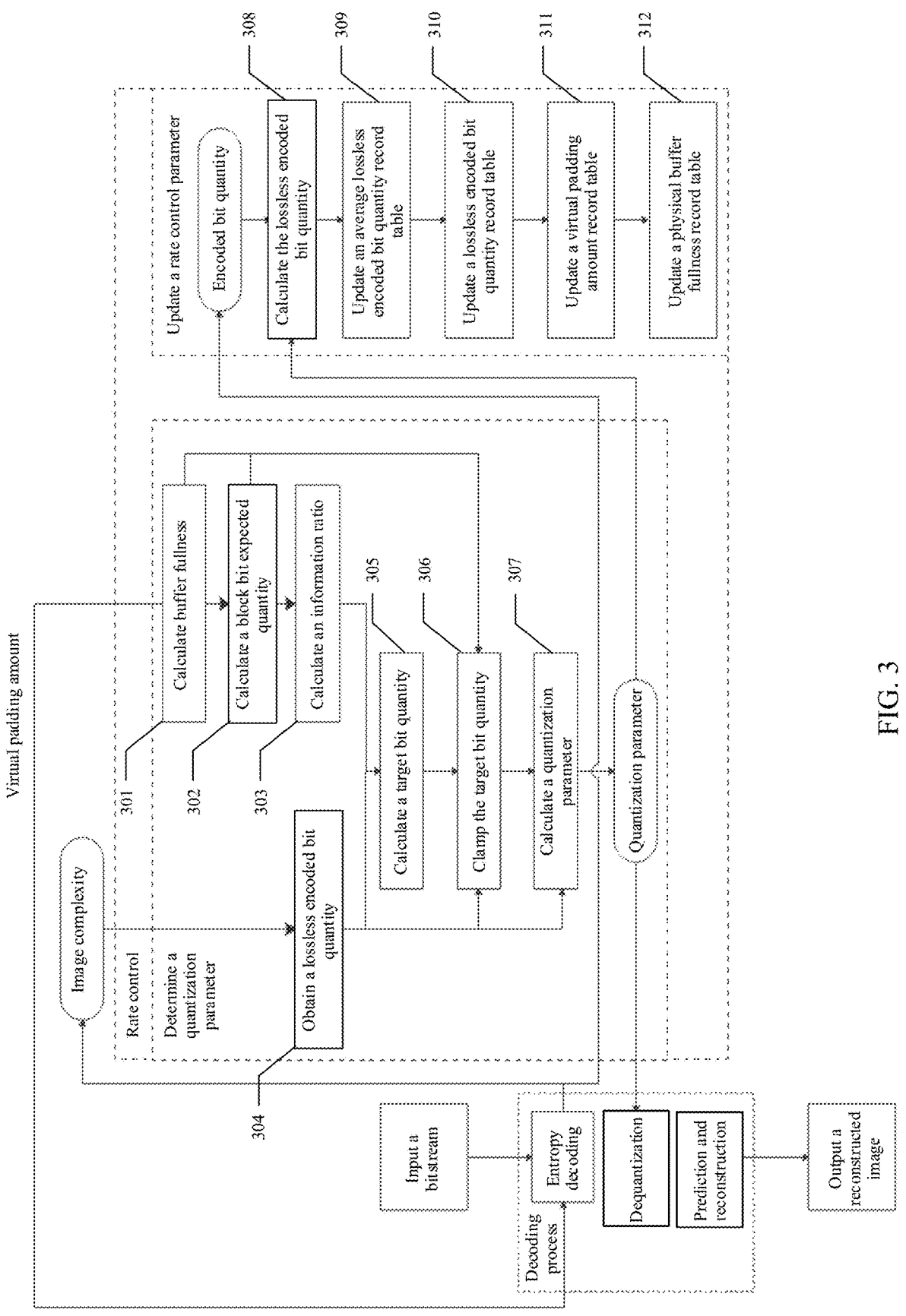
FIG. 3 is another diagram of an overall decoding procedure according to an embodiment of this application.

The following describes the foregoing decoding procedure in detail with reference to rate control. Refer to FIG. 3. A calculation process in rate control mainly includes a process of determining a quantization parameter and a process of updating a rate control parameter. First, in the entropy decoding phase, image complexity and an encoded bit quantity that correspond to an input bitstream are obtained. In rate control, a virtual padding amount and the quantization parameter are obtained based on the image complexity. Then, in the entropy decoding phase, the syntax element is obtained based on the input bitstream and the virtual padding amount provided in rate control. In the dequantization phase, the residual information is output based on the syntax element output in the entropy decoding phase and the quantization parameter provided in rate control. In the prediction and reconstruction phase, the reconstructed image is output based on the residual information. In a process of updating the rate control parameter, calculation and update processing are performed based on the encoded bit quantity provided in the entropy decoding phase and the quantization parameter. The steps are described in detail subsequently, and details are not described herein.

The following uses the first device as an example to describe a process of determining the quantization parameter and updating the rate control parameter in rate control. The process of determining the quantization parameter includes step 301 to step 307. The process of updating the rate control parameter includes step 308 to step 312.

Step 301: Calculate Buffer Fullness.

The first device extracts a physical buffer data amount $PhyBuf_T$ at a specified moment T from a physical buffer fullness record table. The physical buffer fullness record table stores a data amount in a physical buffer during previous encoding/decoding of each coding block.

Then, the first device extracts a virtual padding amount $VirEnd_T$ at the specified moment T from a virtual padding amount record table. The virtual padding amount table stores a data amount of virtual padding performed during previous encoding/decoding of each coding block.

After obtaining $PhyBuf_T$ and $VirEnd_T$, the first device calculates the buffer fullness based on $PhyBuf_T$ and $VirEnd_T$.

Specifically, a process of calculating the buffer fullness F is shown in formula 1.

$$F = \frac{RcBuf_T}{RcBuf_{MAX}} \qquad \text{Formula 1}$$

$$RcBuf_T = PhyBuf_T + X_0 + VirEnd_T.$$

F represents the buffer fullness. $RcBuf_T$ represents a data amount of the buffer at the moment T. $RcBuf_{MAX}$ represents a maximum data amount allowed by the buffer (which may also be referred to as an upper limit of the buffer, may be preset, or may be determined based on hardware storage space, and is not specifically limited herein). $X_0$ is a preset parameter, and may be specifically set based on an actual requirement.

It may be understood that the foregoing formula 1 is an example of calculating the buffer fullness. In actual application, the buffer fullness may be calculated in another manner. This is not specifically limited herein.

Step 302: Calculate a Block Bit Expected Quantity.

The first device calculates the block bit expected quantity, where the block bit expected quantity Bpp represents an expected encoded bit of the current coding block in a case in which image content is not considered.

The first device first obtains an initial value $Bpp_{INI}$ of the expected quantity and an adjustment value $Bpp_{ADJ}$ of the expected quantity. Then, Bpp is calculated based on $Bpp_{INI}$ and $Bpp_{ADJ}$.

Specifically, a process of calculating the block bit expected quantity Bpp is shown in formula 2.

$$Bpp = Bpp_{INI} + Bpp_{ADJ}. \qquad \text{Formula 2}$$

$Bpp_{INI}$ is obtained by multiplying an original bit quantity of an input image block by a preset compression rate. $Bpp_{ADJ}$ is proportional to $(RcBuf_{END} - RcBuf_T)$. $RcBuf_{END}$ is an expected data amount of a rate control buffer at an end of the encoding/decoding process. $RcBuf_T$ is the data amount of the buffer at the moment T calculated in step 301.

It may be understood that the foregoing formula 2 is merely an example of calculating the block bit expected quantity. In actual application, the block bit expected quantity may be calculated in another manner. This is not specifically limited herein.

Step 303: Calculate an Information Ratio.

The first device first obtains a bit offset bitsOffset and an average lossless encoded bit $B_{AVG}$ at the moment T, and then calculates the information ratio R based on bits Offset and $B_{AVG}$. The information ratio R represents a ratio of information reserved in a coding block to an original coding block after quantization processing.

Specifically, a process of calculating the information ratio R is shown in formula 2.

$$R = (Bpp * Inv\,\text{Tab}[X_3 * B_{AVG} - \text{bits Offset} - 1] + X_4) * X_5 \qquad \text{Formula 3}$$

$$\text{bits Offset} = \text{Bits Offset} - X_1 * Bpp + X_2.$$

Bpp is the block bit expected quantity calculated in step 302. InvTab, $X_1$, $X_2$, $X_3$, $X_4$, and $X_5$ are preset parameters. $B_{AVG}$ represents the average lossless encoded bit at the moment T, and is obtained by querying an average lossless encoded bit record array. Bits Offset represents an initial value of the bit offset.

It may be understood that the foregoing formula 3 is merely an example of calculating the information ratio. In actual application, the information ratio may be calculated in another manner. This is not specifically limited herein.

Step 304: Obtain a Lossless Encoded Bit Quantity.

The first device obtains the lossless encoded bit quantity $B_{LL}$. $B_{LL}$ represents an estimated value of the encoded bit quantity of the coding block in a case in which quantization is not performed, and may be obtained by querying a table $Record_{BLL}$ of a lossless encoded bit quantity record group.

Specifically, $B_{LL} = Record_{BLL}[T][k]$, T represents a specified moment, and k represents the input image complexity.

Step 305: Calculate a Target Bit Quantity.

After obtaining the information ratio R, the lossless encoded bit quantity $B_{LL}$, and the bit offset bits Offset, the first device calculates the target bit quantity $B_{TGT}$ based on R, $B_{LL}$, and bits Offset.

Specifically, a process of calculating the target bit quantity $B_{TGT}$ is shown in formula 4.

$$B_{TGT} = (R * (B_{LL} - \text{bits Offset}) + X_6) * X_7. \qquad \text{Formula 4}$$

R is the information ratio calculated in step 303, $B_{LL}$ is the lossless encoded bit quantity calculated in step 304, bitsOffset is the bit offset calculated in step 303, and $X_6$ and $X_7$ are preset parameters.

It may be understood that the foregoing formula 4 is merely an example of calculating the target bit quantity. In actual application, the target bit quantity may alternatively be calculated in another manner. This is not specifically limited herein.

Step 306: Clamp the Target Bit Quantity.

After obtaining the block bit expected quantity Bpp, the lossless encoded bit quantity $B_{LL}$, and the buffer fullness F, the first device calculates a minimum target bit quantity $B_{MIN}$ and a maximum target bit quantity $B_{MAX}$ based on Bpp, $B_{LL}$, and F. The target bit quantity $B_{TGT}$ is clamped based on $B_{MIN}$ and $B_{MAX}$.

Specifically, a process of clamping the target bit quantity $B_{TGT}$ is shown in formula 5.

$$B_{TGT} = \text{MIN}(\text{MAX}(B_{MIN}, B_{TGT}), B_{MAX}). \qquad \text{Formula 5}$$

It may be understood that the foregoing formula 5 is merely an example of the process of clamping the target bit quantity. In actual application, the process of clamping target bit quantity may alternatively be in another manner. This is not specifically limited herein.

Step 307: Calculate the Quantization Parameter.

After obtaining the lossless encoded bit quantity $B_{LL}$ and the target bit quantity $B_{TGT}$, the first device calculates the quantization parameter QP based on $B_{LL}$ and $B_{TGT}$.

Specifically, a process of calculating the quantization parameter QP is shown in formula 6.

$$QP = (B_{LL} - (B_{TGT} + X_8) * X_9) * X_{10}. \qquad \text{Formula 6}$$

$X_8$, $X_9$, and $X_{10}$ are preset parameters.

It may be understood that the foregoing formula 6 is merely an example of calculating the quantization parameter. In actual application, the quantization parameter may alternatively be calculated in another manner. This is not specifically limited herein.

The following uses the first device as an example to describe a procedure of updating the rate control parameter in rate control. The process of updating the rate control parameter includes step 308 to step 312.

Step 308: Calculate the Lossless Encoded Bit Quantity.

After decoding the bitstream, the first device obtains an actual encoded bit quantity $B_{CU}$ obtained after the current coding block is encoded/decoded, and calculates the lossless encoded bit quantity $B_{LC}$ based on $B_{CU}$ and the quantization parameter QP obtained in step 307.

Specifically, a process of calculating the lossless encoded bit quantity $B_{LC}$ is shown in formula 7.

$$B_{LC} = ((4 * B_{CU} + 8 * QP + X_{11}) + X_8) * X_9. \qquad \text{Formula 7}$$

$B_{CU}$ represents the actual encoded bit quantity obtained after the current coding block is encoded/decoded. QP is the quantization parameter obtained in step 307. $X_8$, $X_9$, and $X_{11}$ are the preset parameters. $X_8$ and $X_9$ are the same as $X_8$ and $X_9$ in formula 6.

It may be understood that the foregoing formula 7 is merely an example of calculating the lossless encoded bit quantity. In actual application, the lossless encoded bit quantity may alternatively be calculated in another manner. This is not specifically limited herein.

Optionally, the first device may further calculate a record table location.

Specifically, a process of calculating the record table location is shown in formula 8.

$$T_{PRE} = (T_{CUR} + N - 1) \% N. \qquad \text{Formula 8}$$

$T_{PRE}$ represents a moment of a previous coding block, $T_{CUR}$ represents a moment of the current coding block, that is, the specified moment T in step 301 to step 307, and N is an interval value between a coding block to which an encoded bit quantity belongs and an image block to which image complexity belongs in rate control input.

It may be understood that the foregoing formula 8 is merely an example of calculating the record table location. In actual application, the record table location may alternatively be calculated in another manner. This is not specifically limited herein.

Step 309: Update an Average Lossless Encoded Bit Quantity Record Table.

After obtaining $T_{PRE}$ and $T_{CUR}$, the first device updates the average lossless encoded bit quantity record table $Record_{BAVG}$ based on $T_{PRE}$ and $T_{CUR}$. $Record_{BAVG}$ is an array whose length is N, and $Record_{BAVG}[t]$ represents a value at a $t^{th}$ location.

Specifically, a process of updating the average lossless encoded bit quantity record table is shown in formula 9.

$$Record_{BAVG}[T_{CUR}] = (Record_{BAVG}[T_{PRE}] + X_{12} * B_{LC}) * X_{13}. \qquad \text{Formula 9}$$

$T_{PRE}$ and $T_{CUR}$ are record table locations calculated in step 308, $B_{LC}$ is the lossless encoded bit quantity calculated in step 308, and $X_{12}$ and $X_{13}$ are the preset parameters.

It may be understood that the foregoing formula 9 is merely an example of updating the average lossless encoded bit quantity record table. In actual application, the average lossless encoded bit quantity record table may alternatively be updated in another manner. This is not specifically limited herein.

Step 310: Update a Lossless Encoded Bit Quantity Record Table.

After obtaining the lossless encoded bit quantity $B_{LC}$, $T_{PRE}$, and $T_{CUR}$, the first device updates the lossless encoded bit quantity record table based on $B_{LC}$, $T_{PRE}$, and $T_{CUR}$. $Record_{BLL}$ is a two-dimensional array whose size is N*K, and $Record_{BLL}$, [t][k] represents a value of image complexity k at the $t^{th}$ location.

Specifically, a process of updating the lossless encoded bit quantity record table is shown in formula 10.

$$Record_{BLL}[T_{CUR}][k] = \qquad \text{Formula 10}$$
$$(Record_{BLL}[T_{PRE}][k] * (8 - X_{14}) + * B_{LC} * X_{14} + 4) * X_{15}.$$

$T_{PRE}$ and $T_{CUR}$ are the record table locations calculated in step 308, $B_{LC}$ is the lossless encoded bit quantity calculated in step 308, and $X_{14}$ and $X_{15}$ are the preset parameters.

It may be understood that the foregoing formula 10 is merely an example of updating the lossless encoded bit quantity record table. In actual application, the lossless encoded bit quantity record table may alternatively be updated in another manner. This is not specifically limited herein.

Step 311: Update a Virtual Padding Amount Record Table.

After obtaining $T_{PRE}$, and $T_{CUR}$, the first device updates the virtual padding amount record table $Record_{VirEnd}$ based on $T_{PRE}$ and $T_{CUR}$. $Record_{VirEnd}$ is a one-dimensional array whose length is N, and $Record_{VirEnd}[t]$ represents a virtual padding amount value at the $t^{th}$ location.

If a quantity of remaining unencoded/undecoded blocks at the moment T is less than or equal to a block quantity threshold $Th_{block}$, $Record_{VirEnd}[T_{CUR}] = Record_{VirEnd}[T_{PRE}]$ $2^{Step}$. If a quantity of remaining unencoded/undecoded blocks at the moment T is greater than the block quantity threshold $Th_{block}$, $Record_{VirEnd}[T_{CUR}] = Record_{VirEnd}[T_{PRE}]$. $Th_{block}$ is the block quantity threshold of a coding unit on which virtual padding is performed in the plurality of coding units. Step indicates a set end decrease step.

Step 312: Update a Physical Buffer Fullness Record Table.

After obtaining $T_{CUR}$, the first device updates the physical buffer fullness record table $Record_{PHY}$ based on $T_{CUR}$. $Record_{PHY}$ is an array whose length is N, and $Record_{PHY}[t]$ represents a value at the $t^{th}$ location.

Specifically, the value of $Record_{PHY}[T_{CUR}]$ is updated to an actual data amount of the current physical buffer.

Further, the first device may further update the record table location. An update process may be represented as $T_{CUR} (T_{CUR}+1) \% N.$ The foregoing uses the first device as an example to describe a decoding procedure and a procedure of determining the quantization parameter and updating the rate control parameter in rate control. The following describes the encoding procedure.

Figure 4:
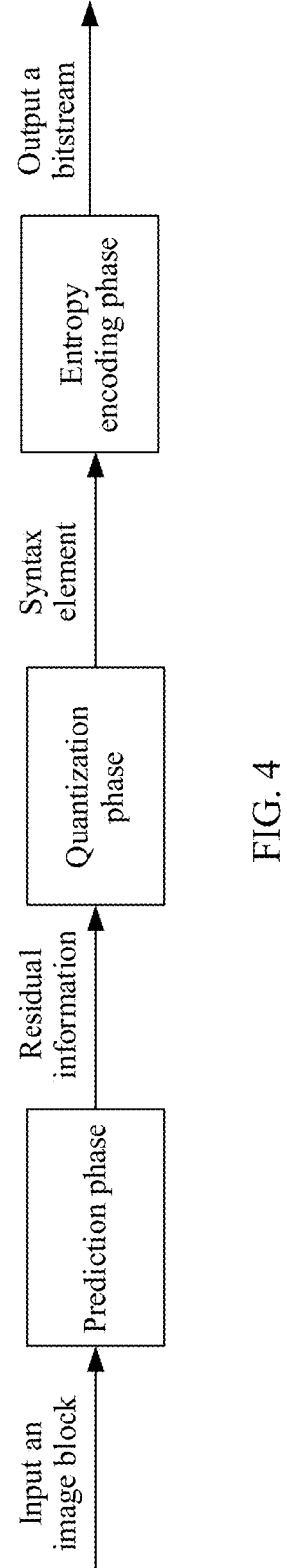
FIG. 4 is a diagram of an overall encoding procedure according to an embodiment of this application.

FIG. 4 shows an overall encoding procedure according to an embodiment of this application. The overall encoding procedure includes a prediction phase, a quantization phase, an entropy encoding phase, and the like. It may be understood that, in actual application, there may be another case in the encoding procedure. For example, the encoding procedure includes the entropy encoding phase. For another example, the encoding procedure includes the quantization phase, the entropy encoding phase, and the like. This is not specifically limited herein.

For example, an encoder side encodes an image block. The encoder side predicts the image block to obtain the residual information, quantizes the residual information in the quantization phase to obtain the syntax element, and performs entropy encoding on the syntax element to output the bitstream.

The encoding method provided in embodiments of this application may be applied to an entropy encoding phase, or may be applied to an overall encoding procedure. This is not specifically limited herein.

Figure 5:
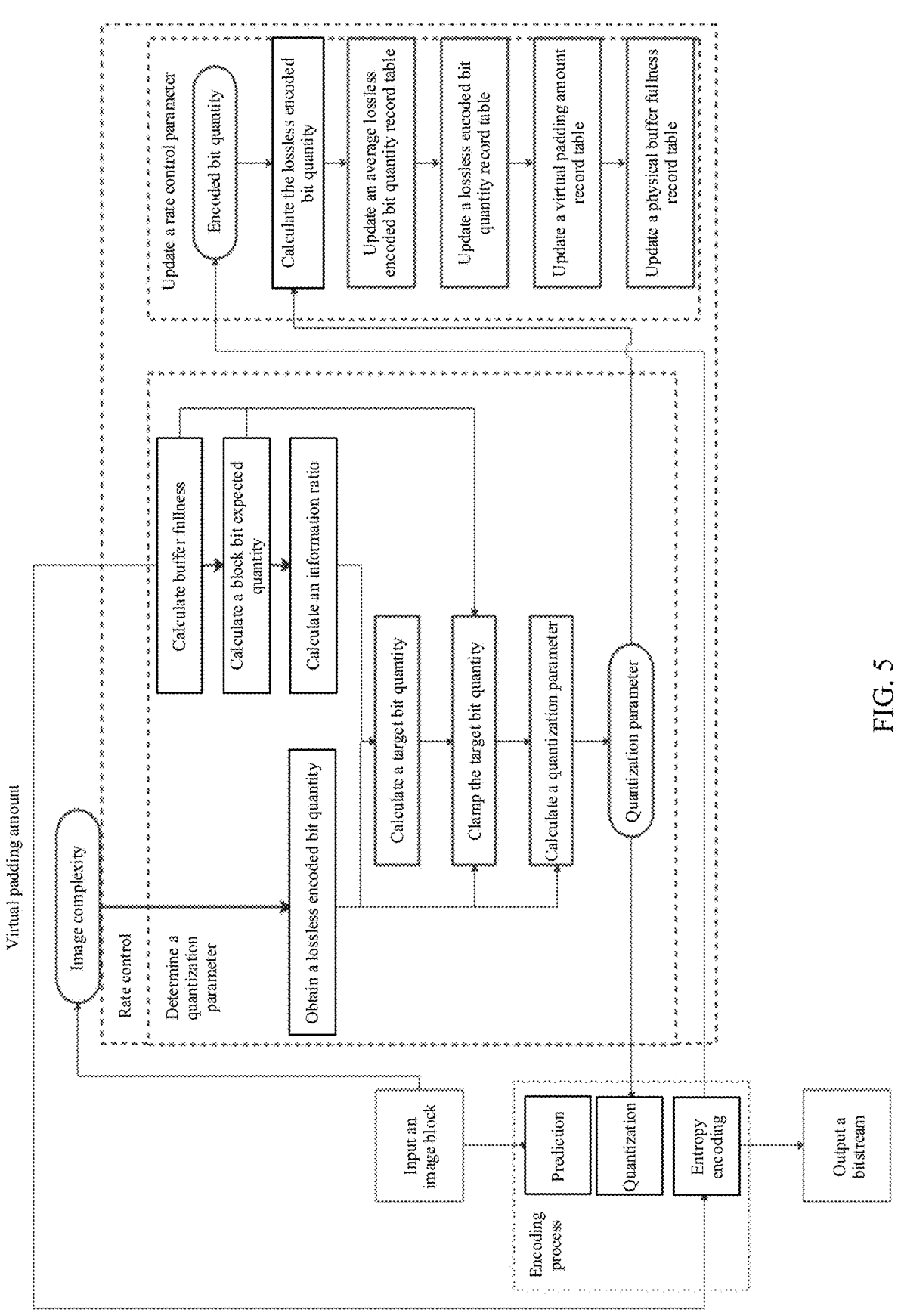
FIG. 5 is another diagram of an overall encoding procedure according to an embodiment of this application.

The following describes the foregoing encoding procedure in detail with reference to rate control. Refer to FIG. 5. First, an input image block is obtained in the prediction phase, and the residual information is obtained based on the input image block. The virtual padding amount and the quantization parameter are obtained based on image complexity in rate control. Then, in the quantization phase, quantization processing is performed based on the residual information and the quantization parameter obtained through rate control, to obtain the syntax element. In the entropy encoding phase, entropy encoding is performed based on the virtual padding amount and the syntax element, to output the bitstream.

A manner of obtaining the image complexity in the encoding process is different from that in the decoding process. In the decoding process, the image complexity is obtained by performing entropy decoding on the input bitstream. A process of obtaining the image complexity in the encoding process includes: dividing the image block into several subblocks. For each subblock, differences between adjacent pixel values are gradually calculated in a horizontal direction and a vertical direction. After absolute values of the differences are summed, a complexity value corresponding to the subblock is obtained. The complexity value is compared with an agreed threshold to obtain a complexity level of the subblock. After a regular operation is performed on the complexity level of each subblock, an image complexity k of the current image block is obtained. The image complexity is one of k values.

In addition, for a processing procedure of rate control, refer to the description of the embodiment shown in FIG. 3. Details are not described herein.

The foregoing describes the overall decoding procedure and the overall encoding procedure. The following describes a decoding method and an encoding method provided in embodiments of this application. The method may be performed by a decoding device, or may be performed by a component (for example, a processor, a chip, or a chip system) of the decoding device. The decoding device may be the first device or the second device in the scenario shown in FIG. 1. The method provided in embodiments of this application may be applied to scenarios such as image and video transmission.

Figure 6:
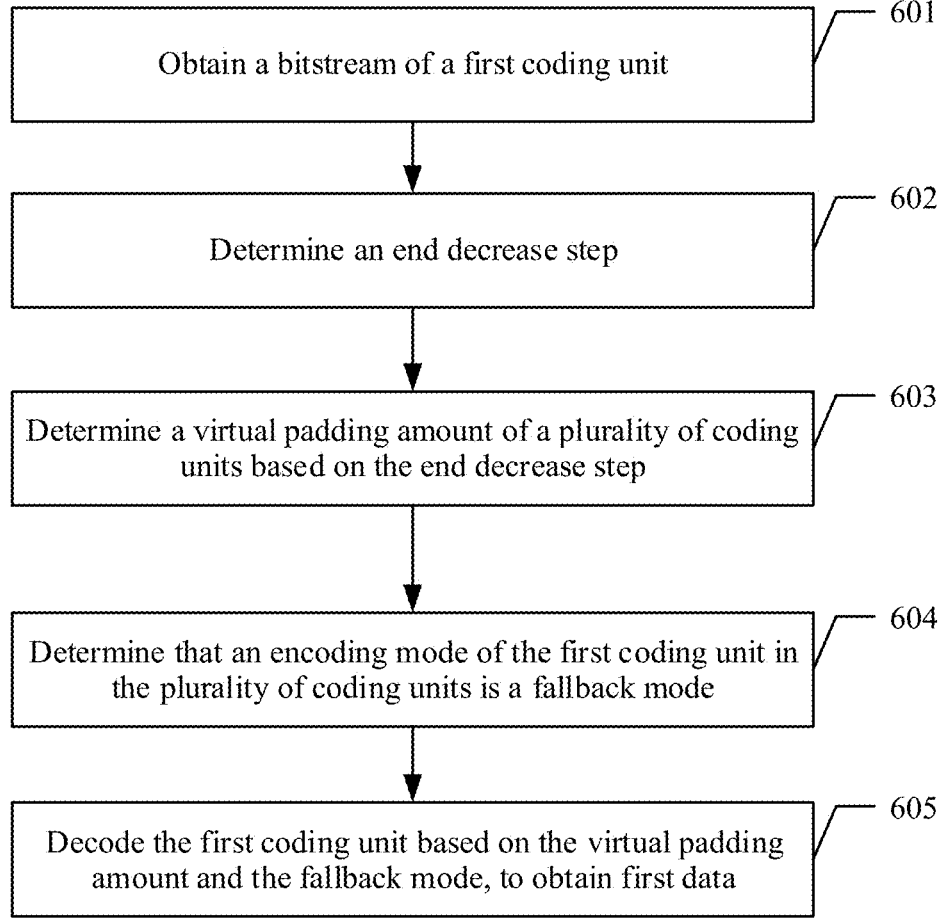
FIG. 6 is a schematic flowchart of a decoding method according to embodiment of this application.

FIG. 6 is a schematic flowchart of a decoding method according to an embodiment of this application. The method may include step 601 to step 605. The following describes step 601 to step 605 in detail.

Step 601: Obtain a Bitstream of a First Coding Unit.

In this embodiment of this application, a decoding device obtains the bitstream of the first coding unit in a plurality of manners. In a possible implementation, the decoding device receives the bitstream of the first coding unit sent by an encoding device. In another possible implementation, the decoding device receives bitstreams of a plurality of coding units that are sent by an encoding unit, and determines the bitstream of the first coding unit from the bitstreams of the plurality of coding units. In another possible implementation, the decoding device selects the bitstream of the first coding unit from a database/memory. This is not specifically limited herein.

The first coding unit is at least one of the plurality of coding units.

Step 602: Determine an End Decrease Step.

The decoding device determines the end decrease step, where the end decrease step is used to update a virtual padding amount of the plurality of coding units. From a perspective of a result, the virtual padding amount is used to reduce storage space of a buffer in the decoding device. From a perspective of a process, the virtual padding amount virtually increases a data amount input to the buffer in a decoding process, so that actual storage space of the buffer increases, to reduce a risk of overflow of the data amount of the buffer after the first coding unit is decoded.

Optionally, before the decoding device determines the end decrease step, the decoding device first obtains an original bit quantity of the first coding unit, a preset compression rate, and a minimum encoded bit quantity of the plurality of coding units. The original bit quantity of the first coding unit may be understood as a bit quantity of the first coding unit before encoding. Generally, the original bit quantity is carried in the bitstream, so that the decoding device can obtain the original bit quantity of the first coding unit based on the bitstream. The preset compression rate and the minimum encoded bit quantity may be set based on an actual requirement. This is not specifically limited herein.

In this case, a process of determining the end decrease step includes step 1 and step 2.

Step 1: Determine an end decrease step logarithm value based on the original bit quantity of the first coding unit, the preset compression rate, and the minimum encoded bit quantity of the plurality of coding units.

First, a range of the end decrease step logarithm value is determined based on the original bit quantity of the first coding unit, the preset compression rate, and the minimum encoded bit quantity of the plurality of coding units. Then, a specific value of the end decrease step logarithm value is selected from the range.

Specifically, an upper limit of the end decrease step logarithm value is a logarithm value of a first difference to base 2, and the first difference is a difference obtained by subtracting the minimum encoded bit quantity from a product of the original bit quantity and the preset compression rate. A lower limit of the end decrease step logarithm value is 0. In other words, a range of the end decrease step logarithm value is $[0, \log_2 \text{Step}_{max}]$, where $\log_2 \text{Step}_{max} = \log_2 (\text{Bpp}_{INI} - \text{B}_{fbmin})$, $\text{Bpp}_{INI}$ represents an initial value of an expected quantity, and is obtained by multiplying an original bit quantity of an input image block by the preset compression rate, and $B_{fbmin}$ represents the minimum encoded bit quantity of the plurality of coding units.

After determining the range of the end decrease step logarithm value, the decoding device may select a specific value of the end decrease step logarithm value from the range based on a first preset condition or randomly.

Preferably, the first preset condition is that the end decrease step logarithm value is a second value, the second value is within the foregoing range, and the second value meets a second preset condition. The second preset condition includes that a quotient of a third difference divided by 2 to the power of the second value is greater than or equal to a preset threshold. In addition, the quotient is less than or equal to a logarithm value of a third value, the third difference is a difference between an upper storage capacity limit of the buffer and an expected storage capacity, and the third value is a quantity of coding units on which virtual padding is performed in the plurality of coding units.

The foregoing preferred process may be understood as: a second value is (i=$\log_2$Step). In the foregoing range, a value of $D_{worst}/2^i$ is set to be largest, and $D_{worst}/2^i$ is less than or equal to $\log_2$Th$_{block}$. $D_{worst}$=(RcBuf$_{MAX}$−RcBuf$_{END}$), RcBuf$_{MAX}$ represents a maximum value of a rate control buffer, and RcBuf$_{END}$ represents an expected data amount of the rate control buffer. RcBuf$_{END}$ is a preset value, RcBuf$_{END}$ may also be understood as reducing the storage space of the buffer to this value, and a value of RcBuf$_{END}$ ranges from 0 to RcBuf$_{MAX}$. Th$_{block}$ is a preset quantity of coding units on which virtual padding is performed (which may also be referred to as a block quantity threshold).

The foregoing process may also be understood as follows: To ensure storage of subsequent image blocks (that is, the buffer does not overflow), the data amount of the buffer needs to be decreased to a specified value, and the decrease amount is determined based on the end decrease step logarithm value and the block quantity threshold.

Step 2: Determine the end decrease step based on the end decrease step logarithm value.

After determining the end decrease step logarithm value, the decoding device determines the end decrease step based on the end decrease step logarithm value.

The end decrease step logarithm value may be denoted as $\log_2$Step, and the end decrease step is Step. It can be seen that Step=$2^{\log_2 Step}$.

It may be understood that the foregoing is merely an example of determining the end decrease step. In actual application, the end decrease step logarithm value may alternatively be determined in another manner. This is not specifically limited herein.

Step 603: Determine the virtual padding amount of the plurality of coding units based on the end decrease step.

After determining the end decrease step, the decoding device determines the virtual padding amount of the plurality of coding units based on the end decrease step. The virtual padding amount is used to reduce storage space of the buffer in the decoding device.

In a possible implementation, if a ranking of the first coding unit in the plurality of coding units is greater than or equal to a preset threshold, the virtual padding amount is determined based on a base data amount and the end decrease step logarithm value, where the preset threshold is used to determine a quantity of coding units on which virtual padding is performed in the plurality of coding units, and the base data amount is a data amount on which virtual padding has been performed in the plurality of coding units before the first coding unit.

Preferably, the virtual padding amount of the plurality of coding units is equal to a sum of a base data amount and the end decrease step.

In another possible implementation, the virtual padding amount of the plurality of coding units is a product of a maximum value in a first set and the end decrease step, the first set includes 0 and a fourth difference, the fourth difference is a difference between the preset quantity and a quantity of second coding units, and the second coding unit is an undecoded decoding unit in the plurality of coding units. The undecoded decoding unit may include a coding unit that needs to be virtually padded and that is not decoded, or may include a coding unit that needs to be virtually padded and that is not decoded and a coding unit that does not need to be virtually padded and that is not decoded.

A process of the foregoing another possible implementation may be shown in formula 11.

$$VirEnd_T = \text{MAX}(Th_{block} - \text{Block}_{remain}, 0) * \text{Step}. \qquad \text{Formula 11}$$

VirEnd$_T$ represents the virtual padding amount of the plurality of coding units at the moment T, Th$_{block}$ is the block quantity threshold, and Block$_{remain}$ represents a quantity of undecoded coding units in the plurality of coding units.

It may be understood that the foregoing several manners are merely several examples of determining the virtual padding amount of the plurality of coding units. In actual application, there may be another manner of determining the virtual padding amount. This is not specifically limited herein.

Step 604: Determine that an encoding mode of the first coding unit in the plurality of coding units is a fallback mode.

The decoding device determines that the encoding mode of the first coding unit in the plurality of coding units is the fallback mode.

Optionally, if the decoding unit receives bitstreams of a plurality of coding units, the decoding device performs entropy decoding on the bitstreams of the plurality of coding units to determine that the encoding mode of the first coding unit in the plurality of coding units is the fallback mode.

Optionally, if the decoding unit receives the bitstream of the first coding unit, the decoding device performs entropy decoding on the bitstream of the first coding unit to determine that the encoding mode of the first coding unit is the fallback mode.

Step 605: Decode the first coding unit based on the virtual padding amount and the fallback mode, to obtain first data.

After determining the virtual padding amount, the decoding device decodes the first coding unit based on the virtual padding amount and the fallback mode, to obtain the first data.

The decoding device first determines an encoding length of the fallback mode based on the virtual padding amount, and then performs processing such as decoding on the bitstream of the first coding unit based on the encoding length, to obtain the first data.

The determining the encoding length of the fallback mode based on the virtual padding amount specifically includes: If the virtual padding amount is greater than 0, the encoding length is a difference between a first value and a header information overhead bit of the fallback mode, the first value is a quotient of a second difference and a quantity of pixels in the first coding unit, and the second difference is a difference obtained by subtracting the end decrease step from the product of the original bit quantity of the first coding unit and the preset compression rate. If the virtual padding amount is equal to 0, the encoding length is a product of the original bit quantity and the preset compression rate. To be specific, different encoding lengths are determined based on different cases of the virtual padding amount, to consider both a decoding process of a coding unit on which virtual padding is performed and a decoding process of a coding unit on which no virtual padding is performed.

It may be understood that, in the foregoing process, the encoding length may also be determined at a granularity of the coding unit. For example, if the second coding unit performs virtual padding, the encoding length of the second coding unit is a difference between the first value and the header information overhead bit of the fallback mode. If the second coding unit does not perform virtual padding, the encoding length of the second coding unit is a product of the original bit quantity of the second coding unit and the preset compression rate.

Optionally, a code length flag $\text{Flag}_{cl}$ of the fallback mode may be further determined first. If $\text{VirEnd}_T > 0$, $\text{Flag}_{cl} = 1$. If $\text{VirEnd}_T \leq 0$, $\text{Flag}_{cl} = 0$. Further, if $\text{Flag}_{cl} = 1$, $\text{Cl}_{data} = (\text{Bpp}_{INI} - \text{Step})/\text{Size}_{block}$. If $\text{Flag}_{cl} = 0$, $\text{Cl}_{data} = \text{Bpp}_{INI}$. $\text{Bpp}_{INI}$ is an initial value of an expected quantity, and is obtained by multiplying the original bit quantity of the input image block by the preset compression rate. Step is the end decrease step. $\text{Size}_{block}$ is a pixel quantity of the first coding block. After $\text{cl}_{data}$ is calculated, the encoding length of the fallback mode is $\text{cl} = \text{cl}_{data} - \text{cl}_{header}$, and $\text{cl}_{header}$ is the header information overhead bit of the fallback mode.

In addition, in this step, there are a plurality of cases in which the decoding device performs processing such as decoding on the bitstream of the first coding unit based on the encoding length to obtain the first data. For example, the decoding device performs entropy decoding on the bitstream of the first coding unit based on the encoding length to obtain a syntax element (that is, the first data is the syntax element). For another example, the decoding device performs processing such as entropy decoding and dequantization on the bitstream of the first coding unit based on the encoding length to obtain a reconstructed image (that is, the first data is a reconstructed image).

It should be noted that there is no time sequence limitation on the steps in this embodiment of this application. For example, step 602 may be performed after step 604. For another example, step 604 may be performed after step 603.

In this embodiment of this application, on one hand, in an encoding/decoding process, the virtual padding amount is considered in the fallback mode, that is, encoding/decoding is performed based on the virtual padding amount and the fallback mode, and the virtual padding amount may be used to reduce the storage space of the buffer. This reduces buffer overflow in the encoding/decoding process in the fallback mode. Specifically, the end decrease step is determined based on the minimum encoded bit quantity in the fallback mode, and the encoding length of the fallback mode is set based on the end decrease step, to reduce buffer overflow. It may also be understood that, during virtual padding, the end decrease step is considered for a code length in the fallback mode, to ensure that the data amount of the buffer does not overflow after decoding of the current coding unit ends. On the other hand, the data amount of the buffer is gradually reduced to an expected data amount of the buffer through virtual padding. In actual encoding, the fallback mode is the last barrier to ensure that no overflow occurs. A virtual padding operation of rate control needs to be used to ensure that no buffer overflow occurs in the fallback mode during virtual padding. Specifically, during encoding/decoding, when the coding unit is in a virtual padding state, the minimum encoded bit quantity in the fallback mode is affected by the end decrease step. In addition, a maximum range of the end decrease step is determined by the minimum encoded bit quantity in the fallback mode. This ensures that rate control can use virtual padding to gradually decrease a data amount of a physical buffer to an expected data amount of the buffer, and the buffer does not overflow in the fallback mode in the virtual padding state.

The foregoing describes the decoding method provided in embodiments of this application, and the following describes the encoding method provided in embodiments of this application. The method may be performed by an encoding device, or may be performed by a component (for example, a processor, a chip, or a chip system) of the encoding device. The encoding device may be the first device or the second device in the scenario shown in FIG. 1. The method provided in embodiments of this application may be applied to scenarios such as image and video transmission.

Figures 7, 8:
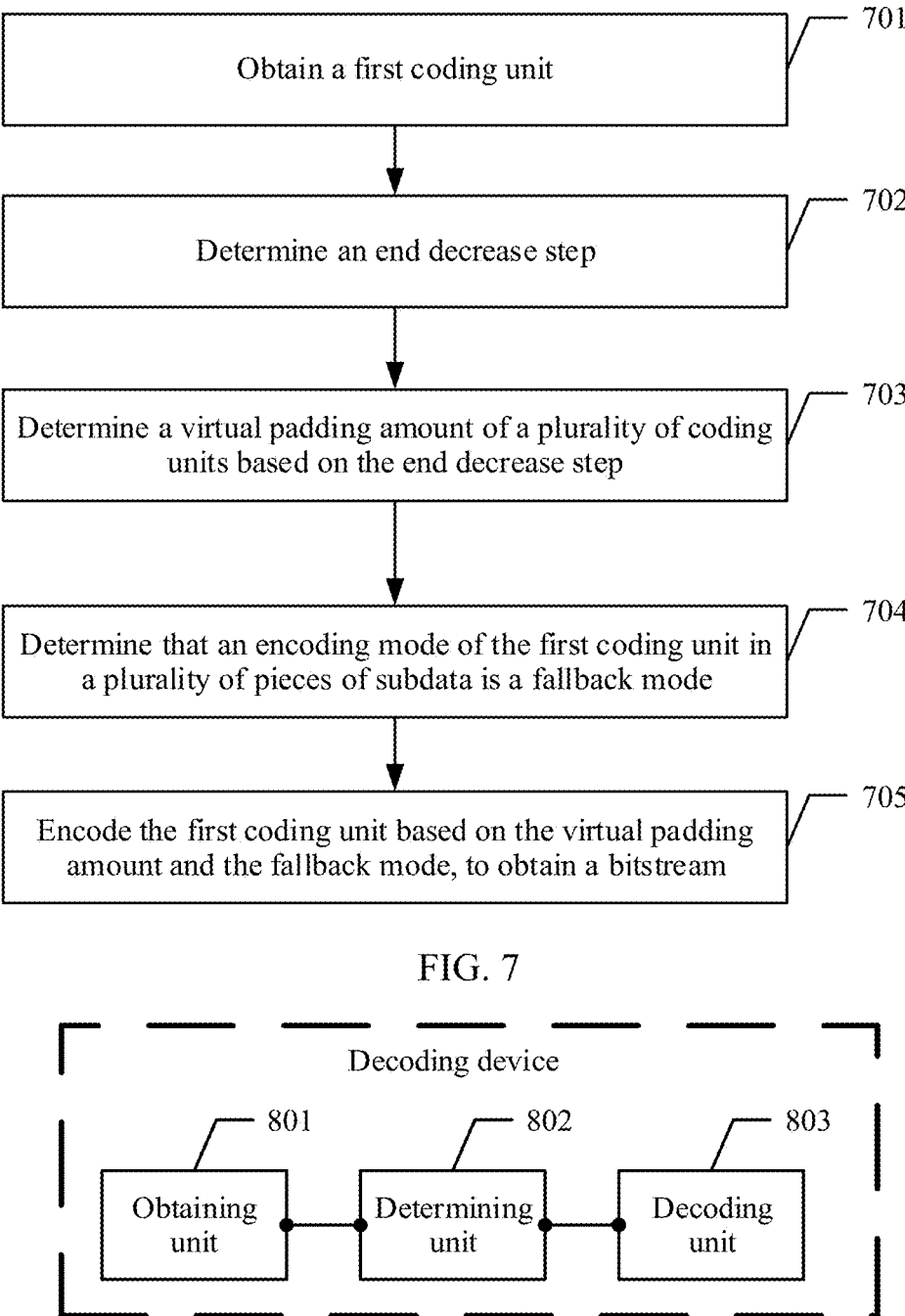
FIG. 7 is a schematic flowchart of an encoding method according to an embodiment of this application.
FIG. 8 is a diagram of a structure of a decoding device according to an embodiment of this application.

FIG. 7 is a schematic flowchart of an encoding method according to an embodiment of this application. The method may include step 701 to step 705. The following describes step 701 to step 705 in detail.

Step 701: Obtain a First Coding Unit.

In this embodiment of this application, an encoding device obtains the first coding unit in a plurality of manners. In a possible implementation, the encoding device collects/photographs the first coding unit through a user operation. In another possible implementation, the encoding device collects/photographs original data through a user operation, then splits the original data to obtain a plurality of coding units, and selects the first coding unit from the plurality of coding units. In another possible implementation, the encoding device selects the first coding unit or the like from a database/memory. This is not specifically limited herein.

Optionally, the encoding device first obtains image data, and splits the image data to obtain a plurality of coding units. The first coding unit is at least one of the plurality of coding units.

Step 702: Determine an End Decrease Step.

The encoding device determines the end decrease step, where the end decrease step is used to update a virtual padding amount of the plurality of coding units, and the virtual padding amount is used to reduce storage space of a buffer in the encoding device.

Description of determining the end decrease step in step 702 is similar to the description in step 602 in the embodiment shown in FIG. 6, and details are not described herein again.

Step 703: Determine the Virtual Padding Amount of the Plurality of Coding Units Based on the End Decrease Step.

After obtaining the end decrease step, the encoding device determines the virtual padding amount of the plurality of coding units based on the end decrease step. The virtual padding amount is used to reduce storage space of a buffer in the encoding device.

A description of determining the virtual padding amount of the plurality of coding units based on the end decrease step in step 703 is similar to the description of step 603 in the embodiment shown in FIG. 6, and details are not described herein again.

Step 704: Determine that an Encoding Mode of the First Coding Unit in a Plurality of Pieces of Subdata is a Fallback Mode.

After obtaining the first coding unit, the encoding device determines that the encoding mode of the first coding unit is the fallback mode.

Optionally, if encoding lengths of the first coding unit corresponding to a plurality of encoding modes are greater than a preset code length, it is determined that the encoding mode of the first coding unit is the fallback mode, where the preset code length is a quotient of a second difference and a quantity of pixels in the first coding unit, and the second difference is a difference obtained by subtracting the end decrease step from a product of an original bit quantity of the first coding unit and a preset compression rate.

It may be understood that the foregoing evaluation indicator being the preset code length is merely an example. In actual application, the evaluation indicator may further include an encoded bit quantity, a distortion degree, and the like. This is not specifically limited herein.

Step 705: Encode the First Coding Unit Based on the Virtual Padding Amount and the Fallback Mode, to Obtain a Bitstream.

After obtaining the virtual padding amount, the encoding device encodes the first coding unit based on the virtual padding amount and the fallback mode to obtain the bitstream.

The decoding device first determines an encoding length of the fallback mode based on the virtual padding amount, and then performs processing such as encoding on the first coding unit based on the encoding length, to obtain the bitstream.

For descriptions of determining the encoding length of the fallback mode based on the virtual padding amount, refer to the descriptions in step 605 in the embodiment shown in FIG. 6. Details are not described herein again.

In addition, in this step, there are a plurality of cases in which the encoding device performs processing such as encoding on the first coding unit based on the encoding length. For example, the encoding device performs entropy encoding on the first coding unit based on the encoding length to obtain the bitstream. For another example, the encoding device performs processing such as prediction, quantization, and entropy encoding on the first coding unit based on the encoding length to obtain the bitstream.

It should be noted that there is no time sequence limitation on the steps in this embodiment of this application. For example, step 702 may be performed after step 704. For another example, step 704 may be performed after step 703.

In this embodiment of this application, in an encoding/ decoding process, the virtual padding amount is considered in the fallback mode, that is, encoding/decoding is performed based on the virtual padding amount and the fallback mode, and the virtual padding amount may be used to reduce the storage space of the buffer. This reduces buffer overflow in the encoding/decoding process in the fallback mode. Specifically, the end decrease step is determined based on the minimum encoded bit quantity of in the fallback mode, and the encoding length of the fallback mode is set based on the end decrease step, to reduce buffer overflow. It may also be understood that, during virtual padding, the end decrease step is considered for a code length in the fallback mode, to ensure that the data amount of the buffer does not overflow after encoding of the current image block ends. On the other hand, the data amount of the buffer is gradually reduced to an expected data amount of the buffer through virtual padding. In actual encoding, the fallback mode is the last barrier to ensure that no overflow occurs. A virtual padding operation of rate control needs to be used to ensure that no buffer overflow occurs in the fallback mode during virtual padding. Specifically, during encoding/decoding, when the coding unit is in a virtual padding state, the minimum encoded bit quantity in the fallback mode is affected by the end decrease step. In addition, a maximum range of the end decrease step is determined by the minimum encoded bit quantity in the fallback mode. This ensures that rate control can use virtual padding to gradually decrease a data amount of a physical buffer to an expected data amount of the buffer, and the buffer does not overflow in the fallback mode in the virtual padding state.

The foregoing describes the decoding method and the encoding method in embodiments of this application. The following describes a decoding device and an encoding device in embodiments of this application.

Refer to FIG. 8. An embodiment of the decoding device in an embodiment of this application includes:

an obtaining unit 801, configured to obtain a bitstream of a first coding unit, where the first coding unit is at least one coding unit in a plurality of coding units;

a determining unit 802, configured to determine an end decrease step, where the end decrease step is used to update a virtual padding amount of the plurality of coding units;

the determining unit 802 is further configured to determine the virtual padding amount of the plurality of coding units based on the end decrease step, where the virtual padding amount is used to reduce storage space of a buffer in the decoding device;

the determining unit 802 is further configured to determine that an encoding mode of the first coding unit in the plurality of coding units is a fallback mode; and a decoding unit 803, configured to decode the bitstream of the first coding unit based on the virtual padding amount and the fallback mode, to obtain first data.

In this embodiment, operations performed by units in the decoding device are similar to those described in the embodiments shown in FIG. 1 to FIG. 6, and details are not described herein again.

In this embodiment, in a decoding process, the virtual padding amount is considered in the fallback mode, that is, the decoding unit 803 performs decoding based on the virtual padding amount and the fallback mode, and the virtual padding amount may be used to reduce storage space of the buffer, thereby reducing buffer overflow in a decoding process in the fallback mode.

Figure 9:
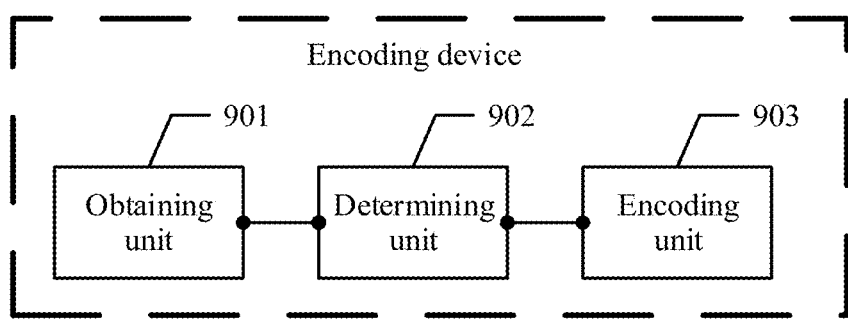
FIG. 9 is a diagram of a structure of an encoding device according to an embodiment of this application.

Refer to FIG. 9. An embodiment of the encoding device in embodiments of this application includes:

an obtaining unit 901, configured to obtain a first coding unit, where the first coding unit is at least one coding unit in a plurality of coding units;

a determining unit 902, configured to determine an end decrease step, where the end decrease step is used to update a virtual padding amount of the plurality of coding units;

the determining unit 902 is further configured to determine the virtual padding amount of the plurality of coding units based on the end decrease step, where the virtual padding amount is used to reduce storage space of a buffer in the encoding device;

the determining unit 902 is further configured to determine that an encoding mode of the first coding unit in the plurality of coding units is a fallback mode; and an encoding unit 903, configured to encode the first coding unit based on the virtual padding amount and the fallback mode to obtain a bitstream.

In this embodiment, operations performed by units in the encoding device are similar to those described in the embodiments shown in FIG. 1 to FIG. 5 and FIG. 7, and details are not described herein again.

In this embodiment, in an encoding/decoding process, the virtual padding amount is considered in the fallback mode, that is, the encoding unit 903 performs encoding based on the virtual padding amount and the fallback mode, and the virtual padding amount may be used to reduce storage space of the buffer, thereby reducing buffer overflow in an encoding process in the fallback mode.

Figure 10:
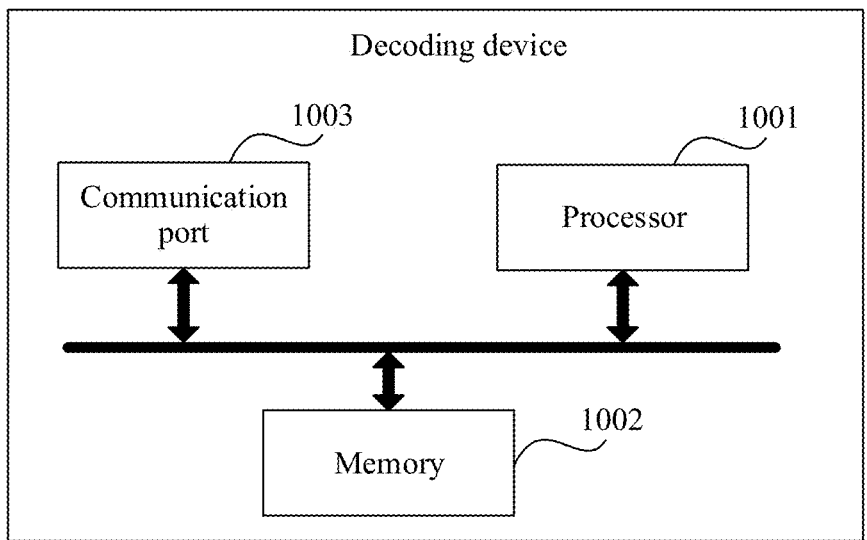
FIG. 10 is another diagram of a structure of a decoding device according to an embodiment of this application.

FIG. 10 is a diagram of a structure of another decoding device according to this application. The decoding device may include a processor 1001, a memory 1002, and a communication port 1003. The processor 1001, the memory 1002, and the communication port 1003 are interconnected through a line. The memory 1002 stores program instructions and data.

The memory 1002 stores program instructions and data that correspond to the steps performed by the decoding device in the implementations corresponding to FIG. 1 to FIG. 6.

The processor 1001 is configured to perform the steps performed by the decoding device in any one of the embodiments shown in FIG. 1 to FIG. 6.

The communication port 1003 may be configured to receive and send data, and is configured to perform steps related to obtaining, sending, and receiving in any one of the embodiments shown in FIG. 1 to FIG. 6.

In an implementation, the decoding device may include more or fewer components than those in FIG. 10. This is merely an example for description in this application, and is not limited.

Figure 11:
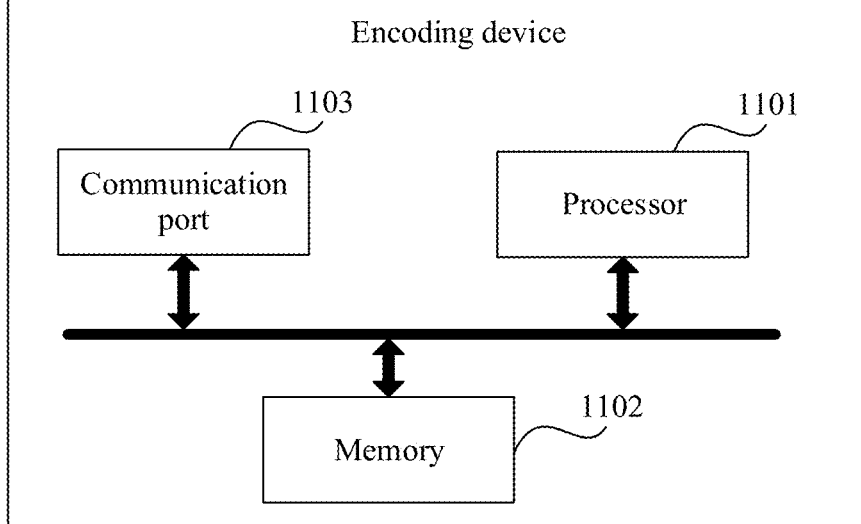
FIG. 11 is another diagram of a structure of an encoding device according to an embodiment of this application.

FIG. 11 is a diagram of a structure of another encoding device according to this application. The encoding device may include a processor 1101, a memory 1102, and a communication port 1103. The processor 1101, the memory 1102, and the communication port 1103 are interconnected through a line. The memory 1102 stores program instructions and data.

The memory 1102 stores program instructions and data that correspond to the steps performed by the encoding device in the implementations corresponding to FIG. 1 to FIG. 5 and FIG. 7.

The processor 1101 is configured to perform the steps performed by the encoding device in any one of the embodiments shown in FIG. 1 to FIG. 5 and FIG. 7.

The communication port 1103 may be configured to receive and send data, and is configured to perform steps related to obtaining, sending, and receiving in any one of the embodiments shown in FIG. 1 to FIG. 5 and FIG. 7.

In an implementation, a data processing device may include more or fewer components than those in FIG. 11. This is merely an example for description in this application, and is not limited.

An embodiment of this application further provides a computer-readable storage medium storing one or more computer-executable instructions. When the computer-executable instructions are executed by a processor, the processor performs the method in the possible implementations of the communication device (for example, the decoding device and/or the encoding device) in the foregoing embodiments.

An embodiment of this application further provides a computer program product (or referred to as a computer program) storing one or more computers. When the computer program product is executed by a processor, the processor performs the method in the possible implementations of the foregoing communication device (for example, the decoding device and/or the encoding device).

An embodiment of this application further provides a chip system. The chip system includes at least one processor, configured to support a function in a possible implementation of the communication device (for example, the decoding device and/or the encoding device). Optionally, the chip system further includes an interface circuit, and the interface circuit provides program instructions and/or data for the at least one processor. In a possible design, the chip system may further include a memory. The memory is configured to store program instructions and data that are necessary for the communication device. The chip system may include a chip, or may include a chip and another discrete component.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (ROM, read-only memory), a random access memory (RAM, random access memory), a magnetic disk, or an optical disc.

The invention claimed is:

1. A decoding method, wherein the method is applied to a decoding device, and the method comprises:

obtaining a bitstream of a first coding unit, wherein the first coding unit is at least one coding unit in a plurality of coding units;

determining an end decrease step, wherein the end decrease step is used to update a virtual padding amount of the plurality of coding units;

determining the virtual padding amount of the plurality of coding units based on the end decrease step, wherein the virtual padding amount is used to reduce storage space of a buffer in the decoding device;

determining that an encoding mode of the first coding unit in the plurality of coding units is a fallback mode; and decoding the bitstream of the first coding unit based on the virtual padding amount and the fallback mode to obtain first data.

2. The method according to claim 1, wherein, before the determining an end decrease step, the method further comprises:

obtaining an original bit quantity of the first coding unit, a preset compression rate, and a minimum encoded bit quantity of the plurality of coding units; and the determining an end decrease step comprises:

determining an end decrease step logarithm value based on the original bit quantity, the preset compression rate, and the minimum encoded bit quantity; and determining the end decrease step based on the end decrease step logarithm value.

3. The method according to claim 2, wherein an upper limit of the end decrease step logarithm value is a logarithm value of a first difference to base 2, and the first difference is a difference obtained by subtracting the minimum encoded bit quantity from a product of the original bit quantity and the preset compression rate.

4. The method according to claim 3, wherein the determining the virtual padding amount of the plurality of coding units based on the end decrease step comprises:

if a ranking of the first coding unit in the plurality of coding units is greater than or equal to a preset threshold, determining the virtual padding amount based on a base data amount and the end decrease step logarithm value, wherein the preset threshold is used to determine a quantity of coding units on which virtual padding is performed in the plurality of coding units, and the base data amount is a data amount on which virtual padding has been performed in the plurality of coding units before the first coding unit.

5. The method according to claim 4, wherein the virtual padding amount is equal to a sum of the base data amount and the end decrease step.

6. The method according to claim 1, wherein the decoding the bitstream of the first coding unit based on the virtual padding amount and the fallback mode comprises:

determining an encoding length of the fallback mode based on the virtual padding amount; and decoding the bitstream of the first coding unit based on the encoding length.

7. The method according to claim 6, wherein:

if the virtual padding amount is greater than 0, the encoding length is a difference between a first value and a header information overhead bit of the fallback mode, the first value is a quotient of a second difference and a quantity of pixels in the first coding unit, and the second difference is a difference obtained by subtracting the end decrease step from the product of the original bit quantity of the first coding unit and the preset compression rate; or if the virtual padding amount is equal to 0, the encoding length is a difference between the product of the original bit quantity and the preset compression rate and a header information overhead bit of the fallback mode.

8. An encoding method, wherein the method is applied to an encoding device, and the method comprises:

obtaining a first coding unit, wherein the first coding unit is at least one coding unit in a plurality of coding units;

determining an end decrease step, wherein the end decrease step is used to update a virtual padding amount of the plurality of coding units;

determining the virtual padding amount of the plurality of coding units based on the end decrease step, wherein the virtual padding amount is used to reduce storage space of a buffer in the encoding device;

determining that an encoding mode of the first coding unit in the plurality of coding units is a fallback mode; and encoding the first coding unit based on the virtual padding amount and the fallback mode to obtain a bitstream.

9. The method according to claim 8, wherein the determining that an encoding mode of the first coding unit in the plurality of coding units is a fallback mode comprises:

if encoding lengths of the first coding unit corresponding to a plurality of encoding modes are greater than a preset code length, determining that the encoding mode of the first coding unit is the fallback mode, wherein the preset code length is a quotient of a second difference and a quantity of pixels in the first coding unit, and the second difference is a difference obtained by subtracting the end decrease step from a product of an original bit quantity of the first coding unit and a preset compression rate.

10. A decoding device, wherein the decoding device comprises:

at least one processor;

one or more memories coupled to the at least one processor, the one or more memories storing programming instructions for execution by the at least one processor to perform operations comprising:

obtaining a bitstream of a first coding unit, wherein the first coding unit is at least one coding unit in a plurality of coding units;

determining an end decrease step, wherein the end decrease step is used to update a virtual padding amount of the plurality of coding units; determining the virtual padding amount of the plurality of coding units based on the end decrease step, wherein the virtual padding amount is used to reduce storage space of a buffer in the decoding device; and determining that an encoding mode of the first coding unit in the plurality of coding units is a fallback mode; and decoding the bitstream of the first coding unit based on the virtual padding amount and the fallback mode, to obtain first data.

11. The device according to claim 10, wherein the one or more memories store programming instructions for execution by the at least one processor to perform operations comprising:

obtaining an original bit quantity of the first coding unit, a preset compression rate, and a minimum encoded bit quantity of the plurality of coding units;

determining an end decrease step logarithm value based on the original bit quantity, the preset compression rate, and the minimum encoded bit quantity; and determining the end decrease step based on the end decrease step logarithm value.

12. The device according to claim 11, wherein an upper limit of the end decrease step logarithm value is a logarithm value of a first difference to base 2, and the first difference is a difference obtained by subtracting the minimum encoded bit quantity from a product of the original bit quantity and the preset compression rate.

13. The device according to claim 12, wherein the one or more memories store programming instructions for execution by the at least one processor to perform operations comprising:

if a ranking of the first coding unit in the plurality of coding units is greater than or equal to a preset threshold, determining the virtual padding amount based on a base data amount and the end decrease step logarithm value, wherein the preset threshold is used to determine a quantity of coding units on which virtual padding is performed in the plurality of coding units, and the base data amount is a data amount on which virtual padding has been performed in the plurality of coding units before the first coding unit.

14. The device according to claim 13, wherein the virtual padding amount is equal to a sum of the base data amount and the end decrease step.

15. The device according to claim 10, wherein the one or more memories store programming instructions for execution by the at least one processor to perform operations comprising:

determining an encoding length of the fallback mode based on the virtual padding amount; and decoding the bitstream of the first coding unit based on the encoding length.

16. The device according to claim 15, wherein:

if the virtual padding amount is greater than 0, the encoding length is a difference between a first value and a header information overhead bit of the fallback mode, the first value is a quotient of a second difference and a quantity of pixels in the first coding unit, and the second difference is a difference obtained by subtracting the end decrease step from the product of the original bit quantity of the first coding unit and the preset compression rate; or if the virtual padding amount is equal to 0, the encoding length is a difference between the product of the original bit quantity and the preset compression rate and a header information overhead bit of the fallback mode.

\* \* \* \* \*